Dec. 17, 1940.    H. K. LORENTZEN    2,225,062
VENETIAN BLIND CONSTRUCTION
Filed Aug. 16, 1939
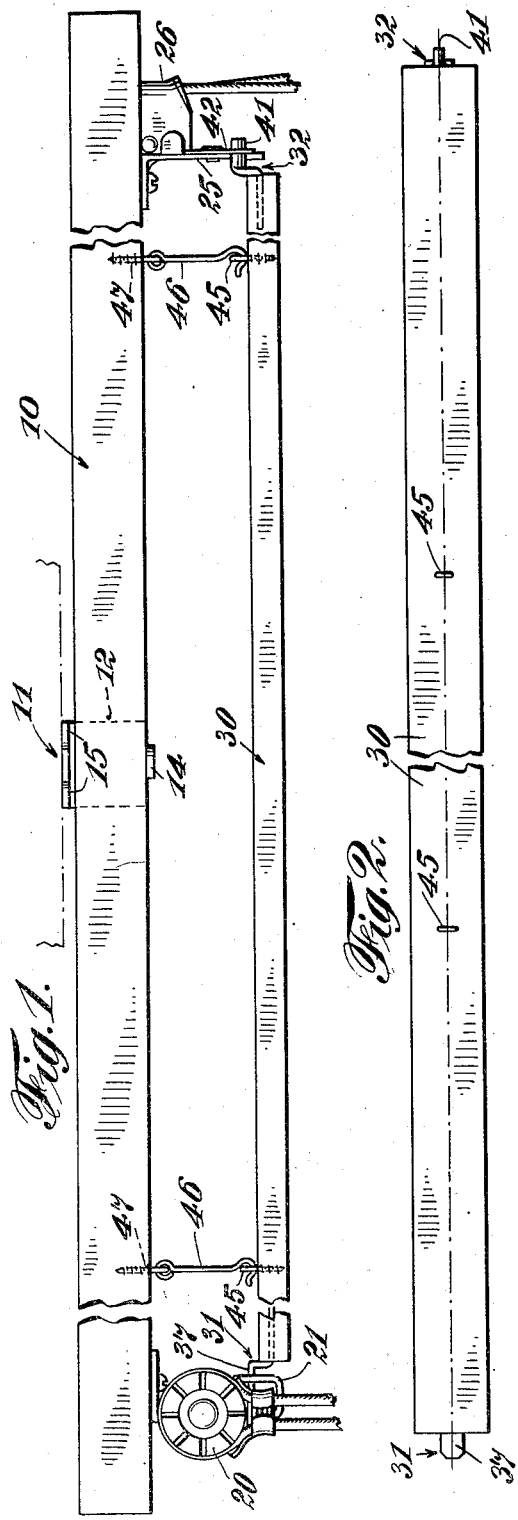
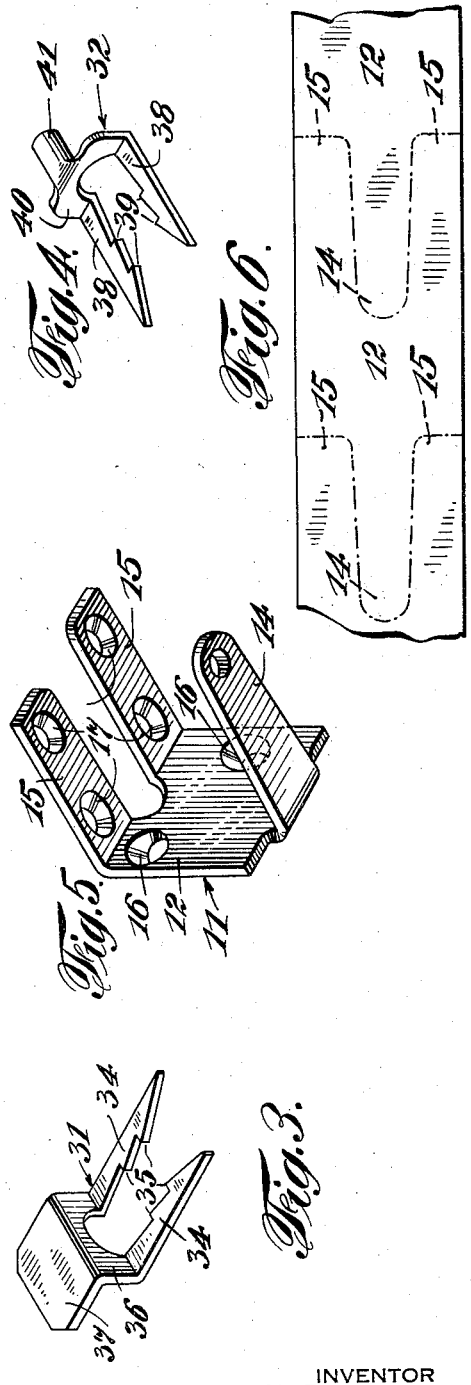
INVENTOR
Hans K. Lorentzen
BY
Ramsey, Kent, Chisholm and Lutz
his ATTORNEYS Patented Dec. 17, 1940

2,225,062

UNITED STATES PATENT OFFICE 2,225,062

VENETIAN BLIND CONSTRUCTION

Hans K. Lorentzen, Montclair, N. J., assignor to Lorentzen Hardware Mf'g. Corp., New York, N. Y., a corporation of New York Application August 16, 1939, Serial No. 290,386

11 Claims. (Cl. 156—17)

This invention relates to improvements in Venetian blind constructions and more particularly to improvements in fittings for use on tilt bars of Venetian blinds whereby bars of extreme length can be supported simply and efficiently.

In the construction of Venetian blinds of considerable length, it is necessary to provide means of support for the tilt bar intermediate the ends thereof, such support being auxiliary to the support provided by fittings applied to the ends of the tilt bar and engaging supporting members fastened to a head bar or other supporting structure. Heretofore, various types of suspending devices have been used but all of such devices have possessed inherent disadvantages, such as requiring the formation of transverse grooves in the tilt bar, actually cutting the tilt bar into a number of sections whereby the suspending devices can be attached between sections, and otherwise weakening the tilt bar so that it is subject to breakage either during manufacture or during use.

An object of the present invention is to provide a Venetian blind construction wherein the tilt bar is mounted for rotation in such fashion that simple suspension devices can be associated therewith intermediate the ends of the bar.

Another object of the invention is to provide a Venetian blind construction in which the tilt bar is mounted for rotation about an axis which is elevated to a point at least above the body of the bar, such location being either coincident with the top surface of the bar or elevated an even greater amount.

A further object of the invention is to provide a Venetian blind construction in which use is made of ordinary hooks and eyes for suspending a tilt bar intermediate the ends thereof.

A still further object of the invention is to provide fittings for Venetian blinds, the fittings being of such character, that when assembled in the normal fashion with a tilt bar, such fittings have parts which define an axis of rotation for the tilt bar which is above the body of the bar.

In carrying out the foregoing and other objects of the invention, a Venetian blind embodying the same is constructed of a head bar or other supporting member from which is suspended for rotary movement a tilt bar. The suspension is carried out by means of a tilt mechanism fastened to the head bar and by a bracket at the opposite end of the tilt bar such bracket also being supported by the head bar. The tilt mechanism may be of any desired character for example, that shown comprises a worm, a gear sector in mesh therewith and having a fitting engaging part formed integrally with the gear sector. A pulley is secured at one end of the worm whereby the worm can be rotated by a guard or other suitable member passing over the pulley.

The fittings of the present invention are adapted to be used in conjunction with the tilt mechanism just described and in conjunction with the bracket located at the other end of the tilt bar. The fitting adapted for engagement with a part of the gear sector is made from sheet metal and is so formed as to have flat prongs, the outer edges of which are substantially parallel, such edge portions terminating in points, and the prongs have their inner edges provided with teeth. Extending substantially in parallelism with the prongs but at a different elevation is a tab portion connected to the leg portions by an intermediate part. This tab portion is adapted to enter a slot in a part of the gear sector so that when the fitting is attached to a tilt bar, rotation of the gear sector about its axis will cause rotation of the tilt bar through the fitting. The fitting for the opposite end of the tilt bar is made in similar fashion to that previously described with the exception that the portion in parallelism with the prongs is in the form of a trunnion to be seated in a suitable recess or slot in the bracket so that rotation of the tilt bar can be accomplished. These two fittings are so proportioned that when they are properly applied to a tilt bar, i. e., the prongs forced into the ends of the tilt bar midway between the top and bottom edges thereof, the tab on one fitting and the trunnion on the other define an axis of rotation for the tilt bar which is elevated to a point at least coincident with the plane of the top surface of the tilt bar and if desired this axis of elevation can be still further elevated.

The purpose of this arrangement is to permit the use of simple hook and eye combinations spaced at desired points intermediate the ends of the tilt bar so that a bar of considerable length can be supported against sagging. Since the eyes of the combinations are attached to the top of the tilt bar with the hooks pivotally attached to the head bar it follows that the hooks can be engaged with the eyes so that this combination forms in effect a hinge with the axis thereof in coincidence with the axis defined by parts of the fittings. Further, to prevent sagging of the blind construction use may be made of a simplified form of bracket which briefly constitutes two parts in substantial parallelism, one part having its principal portion in the nature of a central tongue and the other part having its principal portion of substantially hairpin shape. These parts are joined by a plate-like portion and suitable apertures are provided so that the bracket can be secured either to the under surface of a window frame or to a top front edge of such frame depending on the location of the blind. This brace member may be struck from sheet metal and the construction of the two parallel parts is such that these braces can be made from a strip of metal without any appreciable waste of material.

Other features, objects and advantages of the invention will be apparent by reference to the following detailed description read in the light of the accompanying drawing wherein Fig. 1 is a front view of a part of a Venetian blind construction embodying the invention;

Fig. 2 is a plan view of a tilt bar made in accordance with this invention;

Fig. 3 is a perspective view of one of the fittings embodied in the invention;

Fig. 4 is a similar view of the other fitting;

Fig. 5 is a perspective view of a bracket forming part of this invention;

Fig. 6 is a plan view of a strip of metal, such view illustrating the manner in which a series of blanks for the brackets of Fig. 5 can be stamped or otherwise produced from such strip without any appreciable waste of material.

Referring to the drawing and particularly to Fig. 1, 10 indicates generally a head bar for a Venetian blind construction, such bar being shown broken intermediate its lengths. This bar can be attached either to the under surface of a window frame or in front of the window frame. In the event the bar is of such considerable length that sagging thereof is possible, use may be made of a bracket of the nature shown in Fig. 5. This bracket, indicated generally at 11, has an intermediate portion 12 connecting a tongue part 14 and two spaced leg parts 15, the tongue part 14 and the leg parts 15 being in substantial parallelism. The intermediate part 12 is provided with two counter-sunk holes 16 while the leg parts 15 are provided with four counter-sunk holes 17.

The bracket 11 can be stamped from strip metal, the first operation being to blank the strip in the fashion shown in Fig. 6, wherein it will be seen that each tongue 14 is formed from material removed from between the legs 15. After the blank has been formed it can be provided with the necessary apertures and then shaped into the form shown in Fig. 5.

A bracket of the character illustrated by the member 11 can be secured either to a front surface of a window frame or to the under surface of the top of a window frame by the passage of screws either through holes 16 or holes 17. When so fastened in position the head bar 10 can rest between the tongue 14 and the legs 15 and be supported by the bracket in the manner shown in Fig. 1. This arrangement prevents sagging of head bar of any considerable length, and the number of brackets used depends on the length of the head bar.

Secured to and depending from the head bar 11 is a tilt mechanism made up in some conventional fashion and comprising a pulley 20 on one end of a shaft to which is secured a worm (not shown) meshing with a gear sector (also not shown) which sector has as a part thereof a substantially U-shaped portion 21. Also secured to and depending from the head bar 10 is a supporting bracket 25 combined with cord lock mechanism 26 (not illustrated in detail).

In order that a tilt bar 30 can be suspended for rotation between the portion 21 and the bracket 25, use is made of two fittings indicated generally at 31 and 32. The fitting 31 is stamped from sheet metal of suitable gauge in such form as to provide two flat prongs 34 having straight outer edges terminating in points and having the inner edges provided with teeth 35. Extending at right angles to the rear ends of the prongs 34 is a flat intermediate portion 36 and extending at right angles to the portion 36 is a flat tab 37. Tab 37 is in substantially parallelism to the flat prongs 34. The fitting 31 is adapted to be attached to a tilt bar 30 by forcing the prongs 34 into the end of the bar intermediate the upper and lower surfaces thereof. When a fitting is forced into a bar of proper dimensions, it will be found that the tab 37 extends from the bar with the lower surface of the tab at least as high as the upper surface of the bar. This tab is adapted to be inserted into a slot provided in the arbor 21. The fitting 32 is made in the same manner as the fitting 31 with one exception. Fitting 32 has two flat prongs 38, the inner edges of which have teeth 39. This fitting also has a right angular intermediate part 40 but, instead of tab 37, fitting 32 has a trunnion pin 41 extending from the part 40 in such a manner that the axis of pin 41 is in substantially parallelism with the flat prongs 38. This fitting is designed to be forced into one end of a tilt bar in the same manner as the fitting 31 and when the bar is of the proper dimensions, it will be found that trunnion pin 41 has its axis lying above the upper surface of the tilt bar. The trunnion pin 41 is adapted to be received in a suitable recess in the bracket 25 in conventional manner and may be retained therein by a latch or keeper 42.

When the tilt bar is of considerable length, weight of the blind may cause sagging of the bar intermediate its ends unless some intermediate support is provided. When fittings of the type shown at 31 and 32 are used, it is possible to make use of hook and eye assemblies as intermediate supports. For example, referring to Figs. 1 and 2, eyes 45 can be screwed into the top surface of the tilt bar 30 and hooks 46 attached to the under surface of the head bar by eyes 47.

When one or more of the hook and eye assemblies are used in the manner shown in Fig. 1, it follows that the engagement of a hook 46 with an eye 45 provides a hinge connection between the head bar and the tilt bar with an axis of rotation defined by the engagement of the hook with the eye. This axis of rotation is above the top surface of the tilt bar so that when a hook and eye arrangement is used it is possible to keep the axis of rotation defined by the hook and eye coincident with the axis of rotation defined by fittings 31 and 32. In other words, the axis defined by these fittings can be at such a location as to coincide with the axis of rotation defined by the hook and eye.

The use of the hook and eye intermediate supporting arrangement prevents any weakening of the tilt bar so that the danger, inherent in other devices heretofore used, of breakage of the tilt bar either during manufacture of the blind or during use is substantially prevented. The number of intermediate supports, i. e., the hook and eye arrangements, depends entirely on the length of the tilt bar.

From the foregoing it will be seen that the present invention provides a Venetian blind construction wherein the blind can be of considerable length without incurring the liability of sagging of intermediate parts thereof both of the head bar or supporting device and of the tilt bar. To this end the invention provides fittings which can engage ends of tilt bars; fittings which can be used as intermediate supporting brackets for head bars and fittings which can be used as intermediate supporting devices for tilt bars. It is to be understood that the invention can be modified beyond the illustrated embodiments; in view of which any limitations imposed thereon are to be only those set forth in the following claims.

What is claimed is:

1. In a Venetian blind construction a supporting member, a tilt bar, means carried by said supporting member for supporting said tilt bar' for rotation relative to said supporting member and fittings secured to said tilt bar and engaging said means, said fittings being so shaped that the axis of rotation of the tilt bar is above the top surface of said bar.

2. In a Venetian blind construction a supporting member, a tilt bar, means rotatably supporting said tilt bar below said supporting member including in part fittings so shaped that the axis of rotation of the tilt bar is above the body of said bar.

3. In a Venetian blind construction a supporting member, a tilt bar, means for connecting said tilt bar to said supporting member for relative rotation, said means comprising in part fittings secured to the ends of said tilt bar and having connecting portions so disposed relative to said tilt bar that the axis of rotation thereof is elevated at least to the plane of the top of said bar.

4. In a Venetian blind construction of considerable length, a supporting member, a tilt bar, means carried by said supporting member for supporting said tilt bar for rotation relative to said supporting member and fittings secured to said tilt bar and engaging said means, said fittings being so shaped that the axis of rotation of the tilt bar is above the top surface of said bar, and an intermediate supporting assembly between said supporting member and said tilt bar, said assembly having its axis of rotation in coincidence with the axis defined by said fittings.

5. In a Venetian blind construction a supporting member, a tilt bar rotatably supported below said supporting member, said tilt bar having secured thereto fittings so shaped that the axis of rotation of the tilt bar is above the body of said bar, and an intermediate support for said tilt bar, said support having its axis of rotation above the body of said bar.

6. In a Venetian blind construction a supporting member, a tilt bar of considerable length, means for connecting said tilt bar to said supporting member for relative rotation, said means comprising in part fittings secured to the ends of said tilt bar and having connecting portions so disposed relative to said tilt bar that the axis of rotation thereof is elevated at least to the plane of the top of said bar, and an intermediate support for said tilt bar, said support forming a hinge connection substantially coaxial with the axis of rotation defined by said fittings.

7. In a Venetian blind construction a supporting member, a tilt bar rotatably supported below said supporting member, said tilt bar having secured thereto fittings so shaped that the axis of rotation of the tilt bar is above the body of said bar, and an intermediate support for said tilt bar comprising a hook and eye assembly between said supporting member and the top of said tilt bar.

8. In a Venetian blind construction a supporting member, a tilt bar, means for connecting said tilt bar to said supporting member for relative rotation, said means comprising in part fittings secured to the ends of said tilt bar and having connecting portions so disposed relative to said tilt bar that the axis of rotation thereof is elevated at least to the plane of the top of said bar, an eye in the top of said tilt bar intermediate its ends, and a member engaging said eye for pivotal relative movement on an axis substantially coincident with the axis of said fittings.

9. A fitting for a Venetian blind tilt bar comprising a member adapted to be inserted in said tilt bar midway between the top and bottom surfaces thereof, said fitting having a portion extending therefrom in such spaced relation to the part inserted in the bar that when the fitting is properly inserted in the bar, such extension defines an axis of rotation of the bar above the body of the bar.

10. A fitting for a Venetian blind tilt bar comprising a member adapted to be inserted in said tilt bar midway between the top and bottom surfaces thereof, said fitting having a flat tab-like portion extending therefrom in such spaced relation to the part inserted in the bar that when the fitting is properly inserted in the bar, such extension defines an axis of rotation of the bar above the body of the bar.

11. A fitting for a Venetian blind tilt bar comprising a member adapted to be inserted in said tilt bar midway between the top and bottom surfaces thereof, said fitting having a trunnion pin portion extending therefrom in such spaced relation to the part inserted in the bar that when the fitting is properly inserted in the bar, such trunnion pin defines an axis of rotation of the bar above the body of the bar.

HANS K. LORENTZEN.